United States Patent [19]
Bravet et al.

[11] Patent Number: 5,529,655
[45] Date of Patent: Jun. 25, 1996

[54] LAMINATED PANES AND PROCESS FOR THE PRODUCTION OF SAME

[75] Inventors: Jean-Louis Bravet, Thourotte, France; Otto Jandeleit, Alsdorf, Germany; Eiji Hirano, Yokohama; Seiichi Miyasaka, Yokosuka, both of Japan

[73] Assignees: Saint-Gobain Vitrage International, Courbevoie, France; Ashahi Glass Co. Ltd., Tokyo, Japan

[21] Appl. No.: 242,425

[22] Filed: May 13, 1994

[30] Foreign Application Priority Data

May 13, 1993 [FR] France .................................. 93 05751

[51] Int. Cl.$^6$ .................................................. B32B 31/00
[52] U.S. Cl. ............................ 156/244.17; 156/244.11; 156/272.6; 156/246; 428/426; 428/423.3; 428/425.6
[58] Field of Search ................................. 428/426, 423.3, 428/425.6; 156/244.11, 244.17, 272.6, 246

[56] References Cited

U.S. PATENT DOCUMENTS

| | | |
|---|---|---|
| 4,011,356 | 3/1977 | Lambert . |
| 4,518,555 | 5/1985 | Ravinet et al. . |
| 4,717,516 | 1/1988 | Isaka et al. . |
| 5,032,209 | 7/1991 | Shinbach et al. . |
| 5,061,333 | 10/1991 | Ishikawa et al. . |
| 5,109,765 | 5/1992 | Triffaux . |
| 5,391,416 | 2/1995 | Kunert . |

FOREIGN PATENT DOCUMENTS

| | | |
|---|---|---|
| 0267868 | 5/1988 | European Pat. Off. . |
| 0296042 | 12/1988 | European Pat. Off. . |
| 0391068 | 10/1990 | European Pat. Off. . |
| 2589478 | 5/1987 | France . |
| 4019951 | 1/1992 | Germany . |
| 2139538 | 11/1984 | United Kingdom . |

OTHER PUBLICATIONS

Database WPI, Derwent Publications Ltd., AN 268066, JP-A-62 187 025, Feb. 14, 1986.

*Primary Examiner*—Chester T. Barry
*Attorney, Agent, or Firm*—Oblon, Spivak, McClelland, Maier & Neustadt

[57] ABSTRACT

This invention relates to a laminated safety pane, comprising a monolithic or laminated substrate of glass and/or of plastics material and a sheet of plastics material comprising at least one external polyurethane film providing desirable surface properties. According to the invention, the pane is provided, on at least one zone of the polyurethane film, with a gluing prefilm compatible with a film of adhesive deposited later, this prefilm being deposited after an electrical treatment applied to at least the zone of the polyurethane film which is to receive the prefilm, this electrical treatment being chosen from among the treatments of the corona discharge type.

12 Claims, 1 Drawing Sheet

LAMINATED PANES AND PROCESS FOR THE PRODUCTION OF SAME

BACKGROUND OF THE INVENTION

1. Field of the Invention

This invention relates to laminated panes of the type known as asymmetric panes, composed of a monolithic or laminated support of glass and/or of plastics material and of at least one sheet of plastics material comprising at least one polyurethane film.

2. Discussion of the Background

Asymmetric panes are commonly used as panes for vehicles in the transportation industry, notably as windscreens for automobiles, aircraft and trains, and also in the construction industry as panes in buildings. The mounting of these panes in the window opening of an automobile body for example, by means of a profiled seal of elastic material is now generally obsolete, having been replaced by a mounting process which involves bonding the pane directly to the bodywork or window frame. Indeed, this type of mounting has advantages; notably, in the case of automobiles, it enables the windscreen to be retained in the bodywork opening despite violent impact, the mounting process can be automated and, in addition, it allows flush mounting of the pane with the vehicle body, which apart from improving the aesthetics of the vehicle, has the advantage of reducing the coefficient of penetration of the vehicle through air (drag coefficient).

In the case of the mounting of a conventional laminated pane, that is to say a pane formed of two sheets of glass and one intermediate sheet of an energy-absorbing material, such as polyvinyl butyral, the gluing of the pane onto a fold of the metal sheet of the bodywork is achieved by deposition of a suitable adhesive cord on an enamelled border disposed at the periphery of the surface of the pane which faces towards the vehicle interior, the enamelled border being intended for protecting the adhesive from ultra-violet radiation and also for concealing an inelegant adhesive seal from view.

In the case of the safety panes falling within the scope of the present invention, composed of a rigid support and at least one sheet of flexible plastics material having an external polyurethane film, when the sheet of plastics material is to fulfil the function of an energy absorber, it is necessary to glue the periphery of this sheet directly onto the frame of the vehicle body opening. A cord of suitable adhesive may be that used for gluing laminated panes of the conventional type referred to earlier. This cord is generally a two-component polyurethane or a single-component polyurethane which hardens in the presence of humidity.

When the direct bonding of the sheet of plastics material to the frame of the opening is performed with this cord, the adhesion finally obtained is not entirely satisfactory, the adhesive forces not being initially sufficient or not maintaining their strength sufficiently with time. This insufficient adhesion is due, notably, to the presence of release agents on the surface of the polyurethane film originating from the production process which involves casting the polyurethane film onto a support film of plastics material such as polyester coated with a parting agent. Such parting agents may be, for example, a product based upon silicone.

SUMMARY OF THE INVENTION

This present invention proposes a pane ready for mounting adhesively in an opening which displays the suitability for excellent adhesion, and which retains this suitability even after being stored for a considerable time prior to mounting, for example of the order of several months.

DESCRIPTION OF THE PREFERRED EMBODIMENTS

Figures 1A, 1B:
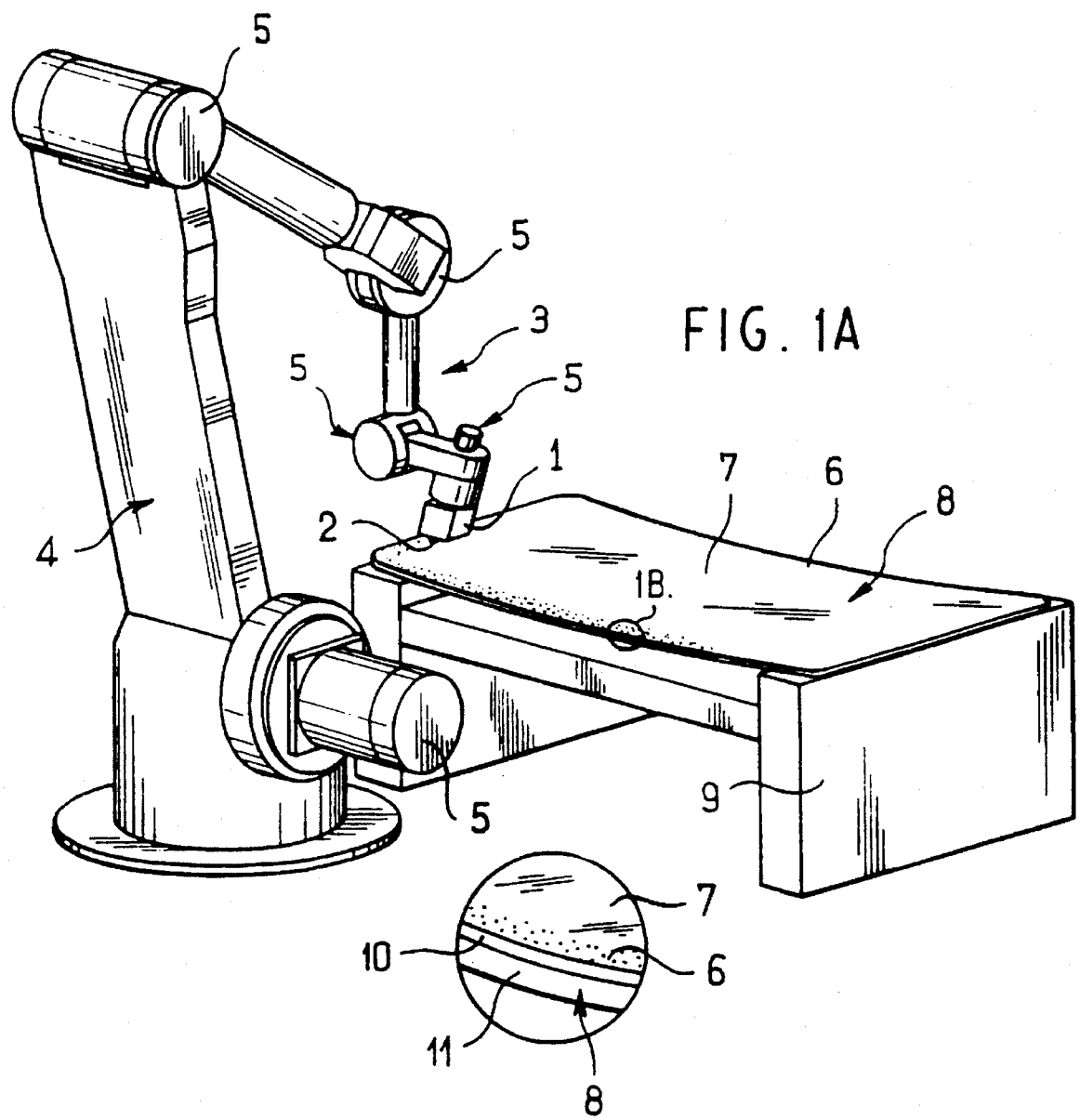
FIG. 1 describes a robotically controlled corona discharge apparatus treating the periphery of an external polyurethane film on a glass substrate.

The pane according to this invention comprises a monolithic or laminated substrate of glass and/or of plastics material and at least one sheet of plastics material comprising at least one external polyurethane film which is provided, on at least one zone, with a gluing prefilm compatible with a film of adhesive to be deposited later, this prefilm being deposited after an electrical treatment applied to at least the zone of the polyurethane film which is to receive the prefilm and being intended for modifying the surface tension of the polyurethane film in this zone, the electrical treatment being chosen from among the treatments of the corona discharge type or the action of an electrical field.

The prefilm may be deposited directly after the electrical treatment. Preferably, this prefilm is deposited in a period between 24 hours and 1 month after this electrical treatment. A longer period following electrical treatment may still be suitable for application of the prefilm, but this period preferably does not exceed 3 months.

In fact, the experiments according to this invention have surprisingly demonstrated that the adhesion obtained after an initial waiting period is found to be better than the adhesion obtained when the prefilm is deposited immediately after the corona treatment.

According to a preferred form of the invention, the electrical treatment is a corona discharge, also termed corona treatment.

The treated zone is at least a portion of the periphery of the pane, generally the entire periphery or the zone corresponding to the placing of the cord of adhesive intended for adhering the pane to a bodywork opening. The treated zone may also be a zone situated further towards the interior of the pane, for example in the case of treating the zone corresponding to the position of a support for a rearview mirror.

According to one embodiment of the pane according to this invention, the prefilm deposited after the electrical treatment comprises a first cord of adhesive of a material compatible with the cord of adhesive deposited later. This cord of adhesive deposited later is notably that used for mounting laminated panes by gluing onto the frame of bodywork openings.

Such adhesives are generally a cord or mastic of polyurethane having a component which hardens with humidity, such as that described in U.S. Pat. Nos. 3,707,521 and 3,779,794; or a cord of mastic of two-component polyurethane, such as described in European Published Applications EP 0 153 456 and EP 0 238 890. It may also be an elastomer based upon polypropylene containing ethylene-propylene-diene monomers (EPDM).

The first cord constituting the prefilm may be formed of the same material or of a material belonging to the same chemical family as the cord of adhesive to be deposited later. When the prefilm is constituted of the first cord described above, it is advantageous to form it directly by extrusion onto the polyurethane film which has undergone the electrical treatment.

In a further embodiment, the prefilm may constitute a primary composition chosen from among the reactive treatment compositions containing an excess of stable NCO groups, the reactive compositions containing an excess of stable OH groups, the compositions based upon polyurethane, or again other compositions intended for improving the adhesion of the adhesive cord to be deposited later.

Preferred primary treatment compositions are, notably, compositions containing an excess of OH groups. The treatment composition or primary may thus contain the basic components for forming a polyurethane having free OH groups, the polyol component being taken in excess, in equivalent terms in relation to the isocyanate component, the ratio of the NCO groups to the OH groups being less than 1, and preferably lying between 0.3 and 0.99 (30–99 index).

In a further embodiment, the treatment composition or primary may be a composition comprising a two-component epoxy resin.

In a still further embodiment, the treatment composition or primary may be based upon a polyoxazolidone resin obtained by condensation of an isocyanate with an epoxy resin in excess, in the presence of a catalyst of the quaternary ammonium salt type.

The isocyanate component may be chosen from among the aliphatic or aromatic difunctional isocyanates, such as hexamethylenediisocyanate, 2,2,4-trimethyl-1,6-hexamethylenediisocyanate, bis(4-isocyanatocyclohexyl)methane isocyanate 1,3-isocyanatomethyl-3,5,5-trimethylcyclohexane isocyanate (isophorone diisocyanate, IPDI), toluene diisocyanate (TDI), isocyanates having a functionality greater than 2 such as the biuret modified isocyanates, the isocyanurate modified isocyanates, the polymeric diisocyanatodiphenylmethane isocyanates having a functionality of between 2 and 3, etc.

The polyol component may be formed of at least one polyol chosen from among the long polyols having a molecular mass between 400 and 4,000 approximately, such as the polyether diols, polyester diols, polycaprolactone diols, and the like.

With advantage, the polyol component comprises at least one long polyol as referred to above and at least one diol having a lower molecular mass, chosen from among those generally used as chain extenders in the preparation of polyurethanes. There may be mentioned, for example, ethylene glycol, 1,2-propanediol, 1,3-propanediol, 1,2-, 1,3-, and 1,4-butanediol, 2,2-dimethyl-1,3-propanediol, (neopentyl glycol), 1,5-pentanediol, 1,6-hexanediol, 1,8-octanediol, 1,10-decanediol, 1,12-dodecanediol, cyclohexanedimethanol, bisphenol A, 2-methylpentane-2,4-diol, 3-methylpentane-2,4-diol, 2-ethylhexane-1,3-diol, 2,2,4-trimethylpentane-1,3-diol, diethylene glycol, triethylene glycol, tetraethylene glycol, 2-butyne-1,4-diol, 2-butene-1,4-diol and decynediol, these being substituted and/or etherified; hydroquinone-bis(2-hydroxyethyl ether), and bisphenol A, these being optionally etherified by two to four moles of propylene oxide; and dimethylolpropionic acid.

The polyol component may be formed of a polyol having a functionality greater than 2, by way of illustration monomeric aliphatic triols such as glycerol, trimethylolpropane, triols having polyether chains, or polycaprolactone triols, the molecular mass of these triols being generally between 90 and 1,000, and mixed polyether/polyester polyols having a functionality greater than 2, for example those having a functionality of from 2 to 3.

Polyols having a functionality greater than 2 may be used alone, notably when the molecular mass is greater than about 400. Such polyols may also be used in a mixture with at least one difunctional long polyol and/or with at least one short diol. The polyol component may also contain a copolymer of vinyl chloride having free hydroxyl groups. A suitable copolymer may be a vinylic resin prepared from vinylchloride, vinyl acetate, and/or 2-hydroxyethyl acrylate having the following general structure:

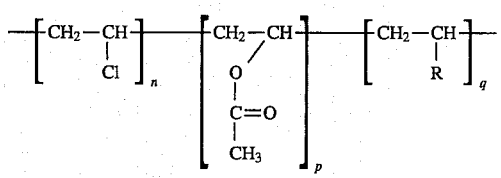

where R is -OH or -COOCH$_2$CH$_2$OH, and having molecular masses between 1,000 and 100,000 approximately, and preferably between 2,000 and 50,000 approximately, the vinyl chloride moiety corresponding to approximately 50 to 95% by weight, the vinyl acetate moiety corresponding to approximately 2 to 40% by weight and the vinylic alcohol or 2-hydroxyethylacrylate moiety corresponding to approximately 2 to 40% by weight. When vinyl chloride and vinyl acetate are utilized solely as monomers, the polymer is partially or fully saponified or hydrolyzed to generate the vinyl alcohol moieties.

The external polyurethane film treated according to the invention has surface properties such as resistance to scratching and resistance to abrasion. Such a film is, for example, of a thermosetting polyurethane such as those described in French Patent publication 2 398 606 and European Patent publication EP-190 517, or in the publications JP-A-86-177 241 and JP-A-86-281 118.

The polyurethane films may be obtained by casting onto a plane support, a reaction mixture containing an isocyanate component comprising at least one isocyanate having a functionality greater than 2, for example a biuret modified isocyanate or an isocyanurate of hexamethylene diisocyanate, and a polyol component comprising a polyol having a functionality greater than 2, for example a polyether polyol having a functionality of 3 or a polycaprolactone triol.

The invention also relates to a device for carrying out the process of producing the pane according to this invention. This device may comprise an industrial robot, the arm of which is equipped with a head making possible the electrical treatment according to this invention, in particular a corona discharge treatment.

The head carried by the arm of the robot may essentially be a discharge electrode, formed of a pair of electrodes connected by a flexible cable for the electrical connection, and a unit disposed outside the track of the robot and containing a high voltage generator. The high voltage field produces a corona discharge between the two electrodes disposed at a short distance from the polyurethane film to be treated, for example of the order of a few millimeters. An air let converted into plasma by the corona discharge passes between the two electrodes. This plasma contacts the surface of the polyurethane film.

In a further embodiment, the corona discharge device may be arranged to operate with one electrode facing the film to be treated, the other electrode being disposed on the opposite side of the glass substrate.

The device may also advantageously comprise, in addition to the means for electrical treatment, means for depositing the prefilm after the electrical treatment. These means may, once again, be an industrial robot carrying a head for application of the prefilm, notably an extrusion head when the prefilm is a cord.

Other advantages and characteristics will become apparent from the description given below of examples of panes according to this invention.

Having generally described this invention, a further understanding can be obtained by reference to certain specific examples which are provided herein for purposes of illustration only and are not intended to be limiting unless otherwise specified.

EXAMPLE 1

An asymmetric laminated pane is prepared by assembling together a sheet of plastics material containing at least one film of plastics material having energy-absorbing properties, for example of polyurethane, and at least one external polyurethane film, on a curved glass sheet. Assembly may be carried out by known calendaring methods followed by an autoclave cycle. The external polyurethane film is a film of thermosetting polyurethane produced from a homogeneous mixture having the following composition:

(a) 1,000 g of a polyether having a molecular weight of approximately 450 obtained by condensation of 1,2-propylene oxide with 2,2-bis(hydroxymethyl)-1-butanol and having a free hydroxyl content of approximately 10.5 to 12%, containing 1% by weight of a stabilizer, 0.05% by weight of dibutyl tin dilaurate catalyst, and 0.1% by weight of a spreading agent, (b) 1,020 g of a biuret of 1,6-hexanediisocyanate having a free isocyanate content (% NCO) of approximately 23.2%.

A casting head is used such as that described, for example, in French Patent Publication 2 347 170. Thus there is formed, for example as described in Patent publications FR-A-2 480 669 and FR-A-2 546 810, by casting onto a tensioned flexible support of polyester coated with a parting agent based upon silicone, a uniform film which, after thermally induced polymerization at elevated temperature, for example for approximately 15 minutes at 120° C., has a thickness of approximately 0.12 mm and "self-healing", properties that is to say, resistance to scratching, abrasion and external agents.

On this film there is formed a second film of polyurethane having energy-absorber properties by casting of a reaction mixture of an isocyanate component and a polyol component. Such a film is described for example, in European published applications EP 0 132 198 or EP 0 389 354. The sheet comprising the two polyurethane films is pulled off the casting support and is then assembled with the glass sheet as already described.

The asymmetric laminated pane is intended for use as windscreen in an automobile vehicle, for example, and should be suitable for mounting by adhesive bonding into the bodywork opening. For this purpose, the zone of the pane, that is to say the zone of the external polyurethane film having scratch-resistance and abrasion-resistance properties, which is to receive the cord of adhesive, is subjected according to this invention to a corona treatment. This treatment may be carried out by means of the device illustrated in FIG. 1.

The preferred electrical treatment device comprises a corona discharge assembly comprising a discharge electrode 1 formed of two electrodes 2 spaced apart by approximately 30 mm, connected to a high-voltage generator and carried at the end of the arm 3 of an industrial robot 4 having a plurality of axes 5, allowing it to follow the desired trajectory, for example in the present case the course of the marginal zone 6 of the external polyurethane film 7 of the pane 8, disposed horizontally on a support table 9, with the polyurethane film facing upwards and forming part of the sheet of plastics material 10 associated with the glass sheet 11.

The treatment consists of actuating the assembly equipped with electrodes, that is to say of electrically energizing this assembly so as to create a corona discharge between the two electrodes and of moving it along the desired trajectory at a distance of from 2 to 5 mm approximately from the surface of the polyurethane film. A suitable corona discharge assembly is sold commercially, for example, under the trade name ARCOJET by the German company ARCOTEC GmbH. The speed of travel is, for example, 2 meters per minute.

After 48 hours have elapsed following this treatment, a primary composition is deposited on the treated zones, this primary composition being prepared in advance by mixing an isocyanate component, partially polymerized methylene diphenyldiisocyanate having a functionality of between 2 and 3, with a polyol component of polypropylene glycol of molecular mass 440, and 1,4-butanediol. The components are taken in quantities such that, to 0.9 isocyanate equivalent there corresponds 1 OH equivalent, of which 0.3 equivalent is provided by the polypropyleneglycol and 0.7 OH equivalent is provided by the 1,4-butanediol.

For producing this reaction composition, 32.7 g of polypropyleneglycol are mixed with 15.3 g of 1,4-butanediol. Methylethylketone solvent is added to give a final concentration of polyurethane of approximately 20%. The concentration depends upon the thickness which it is desired to deposit on the zone to be created of the polyurethane film. To the foregoing mixture there is added 0.3 g of a catalyst, for example dibutyl tin dilaurate (DBTL). Afterwards, 52 g of partly polymerized methylenediphenyldiisocyanate are added.

The reactive composition is spread over the zone to be treated by means of a felt pad. After spreading, polymerization is carried out by heating in an enclosure to 120° C., which produces a skin temperature of approximately 85° C. for approximately 5 minutes. The thickness of the film deposited is approximately 15 to 20 μm.

The pane finally obtained is suitable for mounting by gluing in the frame of a bodywork opening. This suitability for gluing or bonding is retained even after prolonged storage of the pane. The adhesive cord used for bonding may be any adhesive cord used for direct gluing of glass or of glass having an enamelled border to the bodywork opening. Mention may be made, for example, of a cord or mastic of two-component polyurethane or a cord or mastic of single-component polyurethane which hardens with humidity. The adhesion obtained between the surface of the polyurethane of the pane and the adhesive cord is firm and durable.

The adhesion may be evaluated by means of a peeling test on a specimen composed of a tongue of material forming the polyurethane film, of 2 cm width, on which there has been deposited 7 days after the primary deposition following the corona discharge treatment according to this invention, an adhesive cord of the same width used for mounting panes by gluing in the bodywork opening. The adhesive cord used is a seal sold commercially under the trade name BETASEAL HV3.

Adhesion measurements obtained by peeling at 180° of the specimens are carried out just after the hardening under standard conditions of the banding mastic, which in the present case is 7 days.

The adhesion obtained is $H_0$. The adhesion after 7 additional days under humid poultice conditions, conditions known according to the test method RENAULT 1165 H7, is also measured.

Generally, a cohesive rupture of the adhesive cord is desired, with values at "least equal to 60 N/cm for $H_0$ and at least equal to 40 N/cm for $H_7$.

The mean adhesion values, measured for Example 1, are:

$H_0$=100 N/cm $H_7$= 65 N/cm on average with a cohesive rupture of the bonding cord.

REFERENCE EXAMPLE

The cord of BETASEAL HV3 adhesive is deposited directly on the peripheral zone of the polyurethane film, without its having been previously subjected to the corona discharge treatment.

The values obtained, measured in the conditions previously described, are:

$H_0$=12 N/cm with an adhesive rupture, $H_7$=4 N/cm with an adhesive rupture.

EXAMPLE 2

The procedure is as in Example 1, except that there is deposited, onto the zone treated by corona discharge, a primary composition formed of a mixture of an isocyanate component which is partly polymerized methylenediphenyldiisocyanate having a functionality of between 2 and 3, and a polyol component formed essentially of a PVC having hydroxyl end groups, of molecular mass approximately 5,500 and having the general formula:

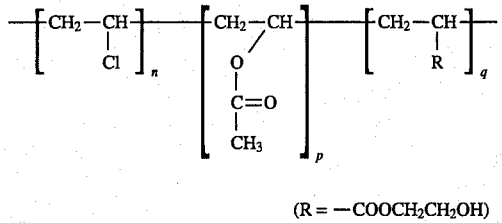

(R = —COOCH$_2$CH$_2$OH)

in which the vinyl chloride moiety represents 67% by weight approximately, the vinyl acetate moiety represents 11% by weight approximately, and the acrylate moiety represents approximately 22% by weight. The components are taken in quantities such that, to 0.8 isocyanate equivalent, there corresponds 1 OH equivalent, and contains dibutyl tin dilaurate as catalyst for the polyurethane, in a proportion of 0.03% of the weight of the polyurethane components. The composition applied is preferably in the form of a solution of the mixture described above, in methylethylketone solvent, the concentration of the reaction mixture being approximately 25% by weight.

The spreading of the reactive composition on the zone of the polyurethane film to be treated is performed with the help or a felt pad. After spreading, polymerization is carried out by heating in an enclosure to 120° C., which gives a skin temperature of approximately 85° C. for approximately 5 minutes. The thickness after drying of the deposited film is approximately 15 to 25 μm.

The pane finally obtained is suitable for mounting by bonding in a bodywork opening. This suitability for gluing is retained even after prolonged storage of the pane.

The average adhesion values, measured by means of the peeling test on a specimen, are:

$H_0$=95 N/cm on average, $H_7$=65 N/cm an average, with a cohesive rupture of the bonding cord.

EXAMPLE 3

The procedure in as in Example 1 except that, after the corona discharge treatment of the periphery of the external polyurethane film, a prefilm of a bonding cord is directly applied by extrusion onto the periphery of the pane. The prefilm deposited may advantageously be a film of single-component polyurethane, such as described in the U.S. Pat. Nos. 3,707,521 and 3,779,794, or a film of multi-component polyurethane, such as described in European published applications EP 0 153 456 and EP 0 238 890. In this example, the prefilm is the product sold commercially under the name "BETASEAL HV3", and are used generally as adhesive cord for mounting panes by bonding in the frames of bodywork openings of motor vehicles. After 7 days, a second cord based upon a single-component polyurethane, for example the product sold commercially under the name TEROSTA 85-90 UHV by the TEROSON company, is deposited.

The mean adhesion values obtained between the external polyurethane film and the prefilm and gluing cord assembly are respectively:

$H_0$=100 N/cm $H_7$=65 N/cm.

The rupture takes place in the assembly composed of the two cords.

These values are entirely satisfactory and are obtained without the use of a primary composition.

EXAMPLES 4 TO 6

The procedure is as in Examples 1 to 3, respectively except that the external polyurethane film of the pane is produced from a homogeneous mixture using the following proportions:

(a) 942 g of a trifunctional polycaprolactone having a free OH radical content of 9.3% by weight, containing 0.015% by weight of dibutyl tin dilaurate, 0.1% by weight of a fluoroalkylated ester as a flow control agent, and 12% by weight of an agent for protection against UV radiation, (b) 1,000 g of a triisocyanurate isocyanate based upon 1,6-hexamethylenediisocyanate, and having a free NCO radical content of 21.5% by weight.

The mean adhesion values, obtained after the corona treatment of the periphery of the polyurethane film, are respectively:

for Example 4: $H_0$=98 N/cm $H_7$=60 N/cm for Example 5: $H_0$=95 N/cm $H_7$=60 N/cm for Example 6: $H_0$=96 N/cm $H_7$=58 N/cm

EXAMPLES 7 TO 9

The procedure is as in Examples 1 to 3, except that the pane treated comprises, as external polyurethane film, a film produced from the following components in the proportions indicated:

(a) 410 g of a hexamethylenediisocyanate trimer of molecular mass 504 and 90 g of hexamethylenediisocyanate, (b) 450 g of trifunctional poly-(ε-caprolactone) polyol of molecular mass approximately 300 and 20 g of difunctional poly-(ε-caprolactone)polyol of molecular mass approximately 3,000. This film is produced by casting onto a tensioned flexible support, as described earlier.

On this first film there is formed a second film of polyurethane having energy-absorbing properties. For assembling these two films with the glass support to form the asymmetric pane, a film of thermoplastic polyurethane is used.

When the pane is being produced, the zone of the external polyurethane film to be treated is subjected to the corona discharge treatment as in the preceding examples.

The mean adhesion values, obtained after the treatment according to this invention, are respectively:

for Example 7: $H_0$=90 N/cm $H_7$=55 N/cm for Example 8: $H_0$=90 N/cm $H_7$=60 N/cm for Example 9: $H_0$=88 N/cm $H_7$=55 N/cm The invention's electric treatment described above, especially the ring-shaped discharge, causes an augmentation of the superficial tension of the treated part of the polyurethane coat in relation to an untreated part. It also causes the contact angle between the surface of the treated part of the polyurethane coat and a drop of water, for example, to decrease in contrast to the contact angle obtained between a nontreated part and the same drop of water.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. A laminated safety pane suitable for adhesive mounting by use of an adhesive material, comprising a monolithic or laminated substrate of glass and/or of plastics material and a sheet of plastics material comprising at least one external polyurethane film having surface properties, wherein on at least one zone of the polyurethane film, there is contained a bonding prefilm compatible with a layer of said adhesive material to be later deposited, said prefilm being deposited after an electrical treatment applied to at least the zone of said external polyurethane film which is to receive said prefilm, said electrical treatment being chosen from among the treatments of the corona discharge type or the action of an electric field.

2. A laminated pane according to claim 1, wherein said electrical treatment is a corona discharge.

3. A laminated pane according to claim 1, wherein the zone of said external polyurethane film provided with the prefilm is at least a portion of the periphery of the polyurethane film.

4. A laminated pane according to claim 1, wherein said prefilm comprises a first cord of adhesive, said first cord of adhesive compatible with said adhesive material later deposited.

5. A laminated pane according to claim 4, wherein said first cord of adhesive is formed of the same material as the cord of said adhesive material deposited later.

6. A laminated pane according to claim 4, wherein said first cord of adhesive is of polyurethane.

7. A laminated pane according to claim 4, wherein said first cord of adhesive is produced by extrusion directly onto the external polyurethane film previously assembled with the pane but following electrical treatment of said external polyurethane film.

8. A laminated pane according to claim 1, wherein said prefilm comprises a primary composition chosen from among the reactive compositions containing an excess of stable NCO groups, the reactive compositions containing an excess of stable OH groups, and compositions based upon polyurethane.

9. A process for the production of a laminated pane ready for mounting by gluing in a window opening, the pane comprising a monolithic or laminated substrate of glass and/or of plastics material and a sheet of plastics material comprising at least one external polyurethane film having surface properties, wherein, after the sheet of plastics material has been assembled with the substrate, at least the zone of said external polyurethane film intended to be glued by means of a bonding adhesive into a window opening, is subjected to electrical treatment chosen from among corona discharge and passage through an electrical field, following which treatment the treated part intended to be glued is coated with a bonding prefilm compatible with said bonding adhesive.

10. A process according to claim 9, wherein the electrical treatment is a corona discharge treatment.

11. A process according to claim 9, wherein said bonding prefilm is formed by extrusion of the adhesive material directly onto the pane.

12. A process according to claim 9, wherein said bonding prefilm is deposited in a period of between 24 hours and 1 month after said electrical treatment.

* * * * *